UNITED STATES PATENT OFFICE.

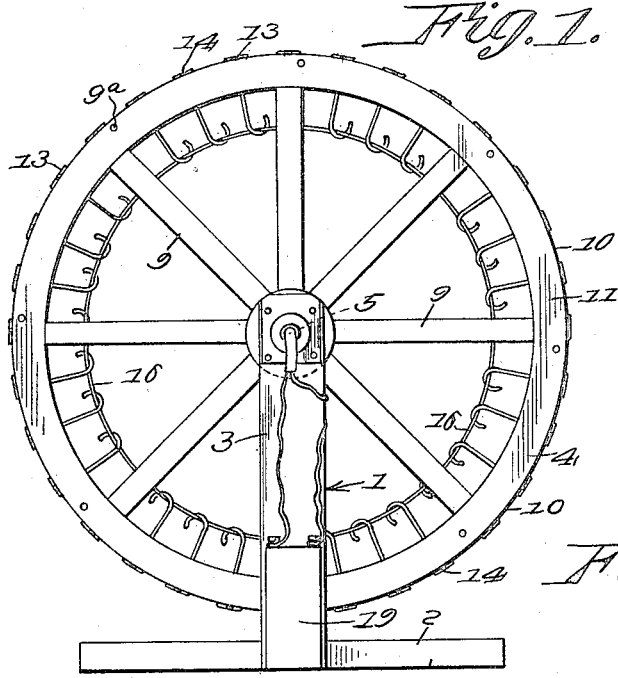

THOMAS Z. BASSETT, OF JUDSONIA, ARKANSAS.

COMBINATION EYEGLASS TESTING AND DISPLAY DEVICE.

1,384,226.  Specification of Letters Patent.  Patented July 12, 1921.

Application filed July 6, 1920. Serial No. 394,175.

*To all whom it may concern:*

Be it known that I, THOMAS Z. BASSETT, a citizen of the United States, residing at Judsonia, in the county of White and State of Arkansas, have invented certain new and useful Improvements in Combination Eyeglass Testing and Display Devices, of which the following is a specification, reference being had to the accompanying drawings.

This invention relates to an improved combination eye glass testing and displaying device particularly adapted for use by oculists and opticians for the purpose of displaying eye glasses as well as facilitating testing the glasses and thereby facilitating the sale of them.

An object of the invention is to provide a device of this kind which is simple, efficient and practical in construction and can be made very cheaply and sold at a reasonable profit.

Another object is the provision of a devision of a device of this kind consisting of a display wheel, a support therefor, and means on the periphery of the wheel to engage parts of the temple pieces to hold the glasses in position and at spaced intervals on the wheel, there being means carried by the wheel to be engaged by the hooks of the temple pieces to prevent detachment of the glasses.

Still another object is the provision of a wheel with eye glasses on the periphery thereof and capable of rotation, in combination with a hub with illuminating means on its interior, so that with an eye testing chart fastened about the hub, a person may look through any one of the glasses and endeavor to read the testing readings on the chart, for the purpose of testing the eyes.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in side elevation of the improved eye glass testing and displaying device constructed in accordance with the invention, Fig. 2 is an edge view of the same, Fig. 3 is a vertical sectional view on line 3—3 of Fig. 2, Fig. 4 is an enlarged detail view through the hub of the eye glass testing and displaying device showing the detail construction thereof, illustrating the electric bulb and also illustrating the means for intermittently lighting the bulb, Fig. 5 is a detail view of a fragmentary portion of the wheel of the display device, showing the series of contact for making and breaking the electric circuit for intermittingly lighting the bulb, Fig. 6 is a detail view of a fragmentary portion of one of the uprights showing a part of the journal of the wheel in section and also part of the support of the bulb in section, showing the contacts for coöperation with the series of contacts of the wheel and illustrating a circuit.

Referring to the drawings, 1 designates a supporting frame which comprises a base 2, the side supports or standards 3. 4 denotes a wheel which is rotatably mounted as at 5 in suitable bearings 6 of the supports 3.

The wheel 4 is provided with a hollow hub 7 which is provided with openings 8. The wheel 4 comprises the opposite concentric wheel sections 9 which are relatively braced to each other by means of the reinforcing rods 9ᵃ adjacent their outer portions. The wheel sections have marginal rims 11, which are angular in cross section, and the annular flanges 10 of which are provided with slots 12. These slots 12 are engaged by parts of the temple pieces of the eye glasses particularly those parts of the temple pieces 13 adjacent where they are hinged to the rims of the glasses 14 so as to hold the eye glasses on the outer periphery of the wheel. Secured to the wheel sections as at 15 are annular rings 16 which are engaged by the ear hooks of the temple pieces to prevent detachment of the eye glasses from the wheel, particularly when the wheel is rotated.

As previously stated, the hub is hollow and its wall is provided with a plurality of openings 8 over which a transparent testing chart 17 engages so that the testing lettering on the chart may be illuminated by the light from an electric bulb or flash light 18 on the interior of the hub. This bulb or flash light receives current from a battery 19.

In using the device the one to whom glasses are to be fitted stands adjacent the periphery of the wheel so that the vision may pass through the lenses of any one of the pair of glasses carried by the wheel so that the lettering on the test chart is visible. The wheel may be rotated until the proper glass is fitted to the eye. The hub with the chart thereon is capable of rotation independently of the wheel so that the different testing letters can be brought opposite any pair of glasses on the wheel.

The hub 8 comprises a band 8$^a$, which is mounted to rotate on the shoulders 8$^b$, of the opposite sides of the central portion of the wheel. This band 8$^a$ carries the lettered chart 17, so that the hub may rotate independently of the wheel, by the operator grasping the band and the chart thereon and impart rotary movement thereto.

A portion of the hub of the wheel of the display device is provided with a plurality of contacts 9$^b$ arranged in circular formation on one end of the hub to coöperate with the stationary contacts 3$^a$ of one of the uprights 3 for intermittently making and breaking the circuit for lighting the bulb or flash light 18. These contacts 9$^b$ are arranged incident to the location of the eye glasses on the wheel so that when a pair of glasses is diametrically opposite certain testing printing on the testing sheet of the hub, the contacts 3$^a$ will be engaged by one of the contacts 9$^b$, thereby lighting the bulb. It will be noted that the contacts 9$^b$ are insulated from each other, so that when each insulation 9$^c$ is passing over the contacts 3$^a$, the support is broken and the light is extinguished.

The invention having been set forth, what is claimed as new and useful is:—

1. In a combined eye glass testing and displaying device, a wheel having a revolubly adjustable illuminated hub, an eye testing chart in surrounding relation thereto, and provided with a plurality of different sizes of eye testing readings, and means on the periphery of the wheel for the support of a plurality of eye glasses arranged in spaced intervals on the wheel.

2. In a combined eye glass testing and displaying device, a wheel, a supporting frame therefor, said wheel having a revolubly movable illuminated hub, a transparent eye testing chart in surrounding relation to the hub, and provided with a plurality of different characters of eye testing readings, said wheel having its periphery provided with means to be engaged by the temple pieces of eye glasses to support the glasses on the wheel.

3. In a combined eye glass testing and display device, a wheel carrying eye glasses on its periphery, a supporting frame therefor, said wheel having a hub, an eye testing chart surrounding the hub, the readings of which being in a line of vision with the eye glasses, means for illuminating the hub intermittently to give off light rays through the chart, when each of the readings on the chart and the respective glasses are in the same line of vision with the eye sight.

4. In a combined eye glass testing and display device, a wheel carrying eye glasses on its periphery, a supporting frame therefor, said wheel having a hub rotatable independently of the wheel, an eye testing chart surrounding the hub, whereby upon adjusting the hub any one of the readings of the chart may aline with the vision of any pair of eye glasses, illuminating means in the hub, means for actuating said illuminating means intermittently to give off light rays, when each of the readings on the chart and the respective glasses are in the same line of vision with the eye sight.

5. In a combined eye glass testing and display device, a wheel carrying a plurality of eye glasses on its periphery, a supporting frame therefor, said wheel having a hub, a transparent eye testing chart provided with a plurality of eye testing readings thereon and being in surrounding relation to the hub, said hub being rotatable independently of the wheel whereby each of the readings may be brought into a line of vision with each of the eye glasses.

6. In a combined eye glass testing and display device, a wheel carrying a plurality of eye glasses on its periphery, a supporting frame therefor, said wheel having a hub, a transparent eye testing chart provided with a plurality of eye testing readings thereon and being in surrounding relation to the hub, said hub being rotatable dependently of the wheel, whereby each of the readings may be brought into a line of vision with each of the eye glasses, and means for illuminating the interior of the hub intermittently, as the readings become disposed in the same line of vision with each of the eye glasses and the eye sight.

7. In a combined eye testing and display device, a wheel having a hub, means on the periphery to connect eye glasses to the wheel, a supporting frame for the wheel, a chart in surrounding relation to the hub and having a plurality of readings disposed in the same line of vision with the respective eye glasses, said hub being rotatable independently of the wheel, whereby each of the readings may be disposed in a line of vision with each of the glasses, said hub having openings opposite where the readings of the chart are disposed, illuminating means in the hub adapted to project its light rays through the openings and the chart.

8. In a combined eye glass testing and display device, a wheel having its outer portion provided with rim pieces of right angle contour in cross section, the lateral flanges of which have slots to be engaged by the temple pieces of eye glasses, annular rings secured to the spokes of the wheel to be engaged by the hooks of the temple pieces, to hold the temple pieces in engagement with the slots, said wheel having a hub provided with openings and having a chart with a plurality of different readings thereon opposite the openings, whereby light rays may project through the chart, each of the readings being in a line of vision with the eye glasses, and a supporting frame for the wheel.

9. In a combined eye glass testing and display device, a wheel hub, a plurality of different eye testing readings at intervals thereabout, and a wheel revolubly movable independently of the hub and vice versa and carrying a plurality of eye glasses at spaced intervals on the periphery of the wheel, whereby the vision of any pair of glasses may aline with any one of the readings on the hub and vice versa.

10. In a combined eye glass testing and display device a wheel hub, a plurality of different eye testing readings at intervals thereabout, and a wheel revolubly movable independently of the hub and vice versa and carrying a plurality of eye glasses at spaced intervals on the periphery of the wheel, whereby the vision of any pair of glasses may aline with any one of the readings on the hub and vice versa, and means for illuminating the hub when any one of the readings and any pair of eye glasses have their visions alined.

In testimony whereof I hereunto affix my signature.

THOMAS Z. BASSETT.